US 6,727,848 B2

(12) United States Patent
Eschenbach

(10) Patent No.: US 6,727,848 B2
(45) Date of Patent: *Apr. 27, 2004

(54) GLOBAL POSITIONING SYSTEM USING ALMANAC DATA FOR A FAST TIME TO FIRST FIX

(76) Inventor: Ralph F. Eschenbach, 20 Oakhill Dr., Woodside, CA (US) 94062

( * ) Notice: Subject to any disclaimer, the term of this patent is extended or adjusted under 35 U.S.C. 154(b) by 26 days.

This patent is subject to a terminal disclaimer.

(21) Appl. No.: 10/208,059

(22) Filed: Jul. 30, 2002

(65) Prior Publication Data
US 2002/0186165 A1 Dec. 12, 2002

Related U.S. Application Data

(63) Continuation-in-part of application No. 10/003,862, filed on Nov. 2, 2001, which is a continuation-in-part of application No. 09/777,425, filed on Feb. 6, 2001, now Pat. No. 6,373,429, which is a continuation of application No. 09/361,916, filed on Jul. 27, 1999, now Pat. No. 6,211,817.

(51) Int. Cl.[7] .............................................. H04B 7/185
(52) U.S. Cl. ............................. 342/357.09; 342/357.03
(58) Field of Search .......................... 342/357.03, 358, 342/357.02, 357.09; 701/215

(56) References Cited

U.S. PATENT DOCUMENTS

| 5,764,184 A | 6/1998 | Hatch et al. ................. 342/357 |
| 6,211,817 B1 | 4/2001 | Eschenbach ........... 342/357.03 |
| 6,225,945 B1 | 5/2001 | Loomis ................. 342/357.12 |
| 6,373,429 B1 | 4/2002 | Eschenbach ........... 342/357.03 |
| 6,559,793 B1 * | 5/2003 | Eschenbach ........... 342/357.03 |

* cited by examiner

Primary Examiner—Thomas H. Tarcza
Assistant Examiner—F H Mull
(74) Attorney, Agent, or Firm—Menlo Patent Agency LLC; David R. Gildea

(57) ABSTRACT

A system using coarse GPS orbital parameters for providing a precise GPS location. The system includes a GPS reference receiver and a GPS user receiver. Coarse locations-in-space of GPS satellites are computed from almanac or old ephemeris data. In a first embodiment the GPS user receiver uses DGPS corrections based upon the same coarse orbital parameters for providing a precise DGPS user location. In a second embodiment the GPS user receiver computes a coarse location from the coarse orbital parameters; and the GPS reference receiver recalculates the user pseudoranges using the same coarse orbital parameters and then uses the recalculated user pseudoranges for providing a more accurate user location.

18 Claims, 10 Drawing Sheets

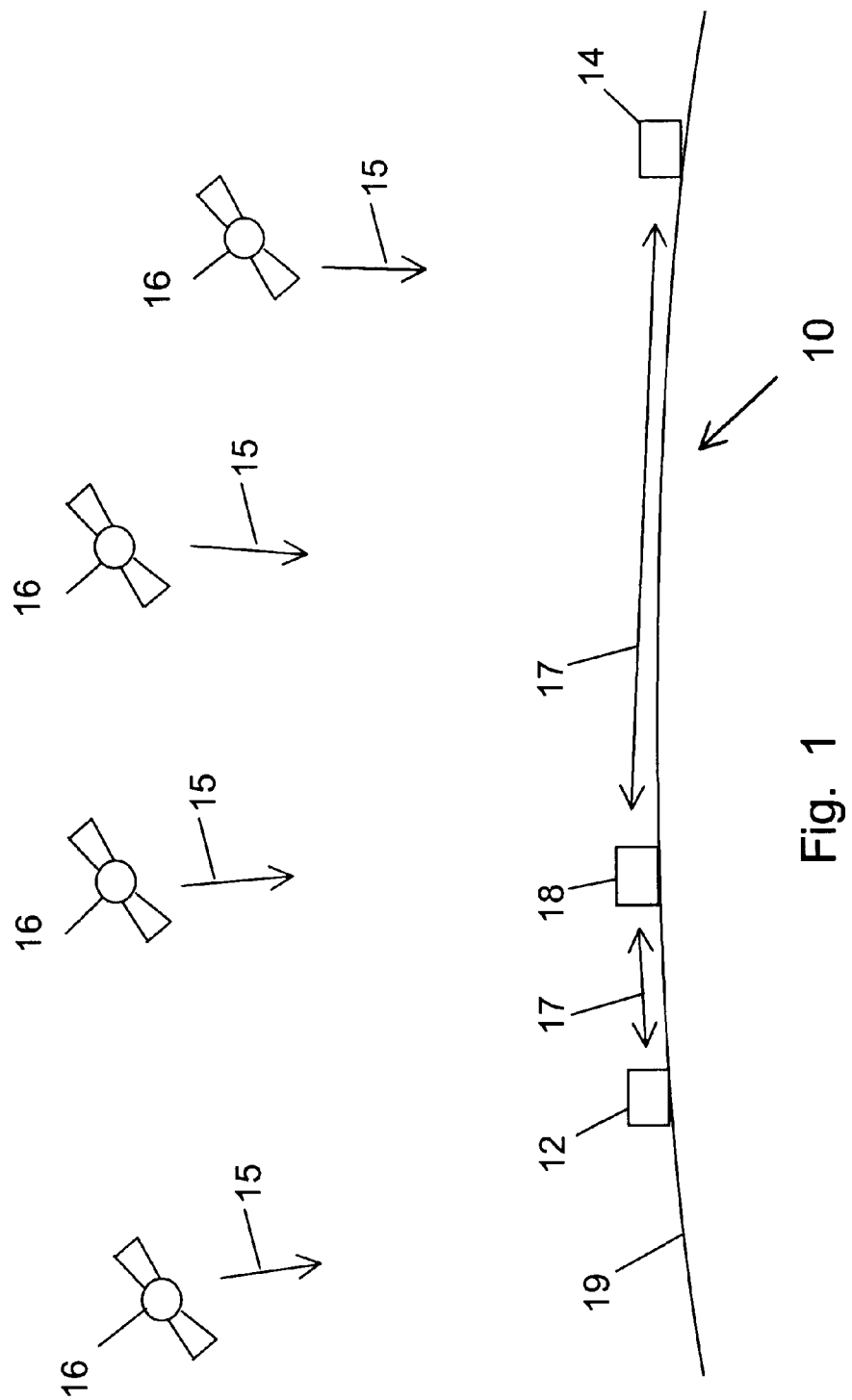

| PARAMETER | DEFINITION | NO. OF BITS | SCALE FACTOR (LSB) | EFFECTIVE RANGE | UNITS |
|---|---|---|---|---|---|
| e | ECCENTRICITY | 16 | $2^{-21}$ | | DIMENSIONLESS |
| $t_{oa}$ | REFERENCE TIME ALMANAC | 8 | $2^{12}$ | 602,112 | SECONDS |
| $\delta_i$ | RELATIVE TO INCLINATION ANGLE AT REFERENCE TIME $i_o$ - 0.30 | 16 * | $2^{-19}$ | | SEMI CIRCLES |
| OMEGADOT | RATE OF RIGHT ASCENSION | 16 * | $2^{-38}$ | | SEMI CIRCLES/SEC |
| $(A)^{1/2}$ | SQUARE ROOT OF SEMI-MAJOR AXIS | 24 | $2^{-11}$ | | $METERS^{1/2}$ |
| $(OMEGA)_0$ | LONGITUDE OF ASCENDING NODE OF ORBIT PLANE AT WEEKLY EPOCH | 24 * | $2^{-23}$ | | SEMI CIRCLES |
| $\omega$ | ARGUMENT OF PERIGEE | 24 * | $2^{-23}$ | | SEMI CIRCLES |
| $M_0$ | MEAN ANOMALY AT REFERENCE TIME | 24 * | $2^{-23}$ | | SEMI CIRCLES |
| $a_{f0}$ | POLYNOMIAL TIME TERM (CONSTANT) | 11 * | $2^{-20}$ | | SECONDS |
| $a_{f1}$ | POLYNOMIAL TIME TERM (FIRST ORDER) | 11 * | $2^{-38}$ | | SEC/SEC |

FIG. 4

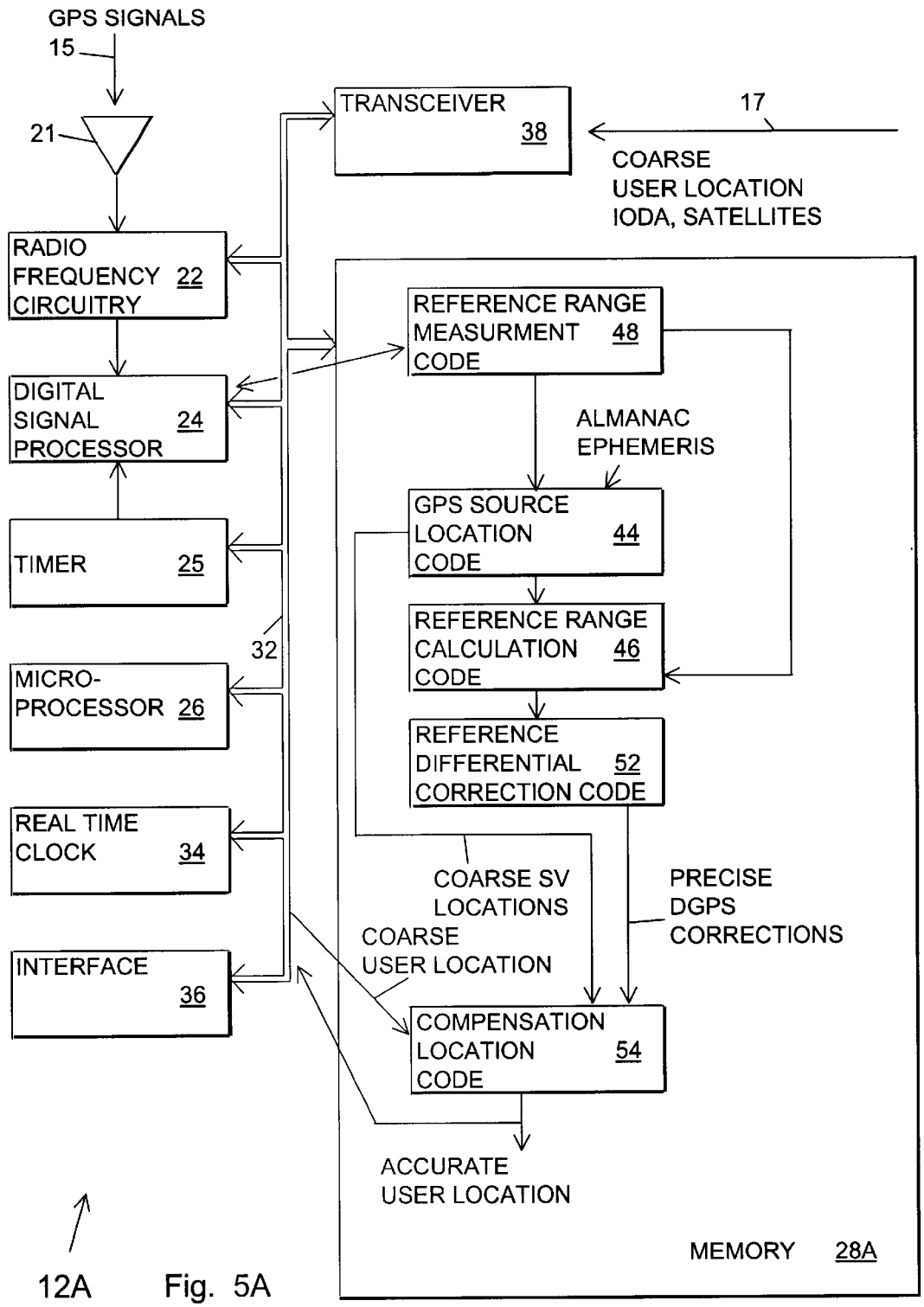

GLOBAL POSITIONING SYSTEM USING ALMANAC DATA FOR A FAST TIME TO FIRST FIX

CROSS REFERENCE TO RELATED APPLICATIONS

This application is a continuation-in-part of pending application Ser. No. 10//003,862 filed Nov. 2, 2001 which was a continuation-in-part of application Ser. No. 09/777,425 filed Feb. 6, 2001 now U.S. Pat. No. 6,373,429 issued Apr. 16, 2002 which was a continuation of application Ser. No. 09/361,916 filed Jul. 27, 1999 now U.S. Pat. No. 6,211,817 issued Apr. 3, 2001 all by the same inventor and assigned to the same assignee.

BACKGROUND OF THE INVENTION

1. Field of the Invention

The invention relates generally to a global positioning system (GPS) and more particularly to a GPS system using almanac data for determining a fast accurate GPS-based location.

2. Description of the Prior Art

The global positioning system (GPS) is a satellite based location and time transfer system developed by the United States government and available free of charge to all users. A GPS user location is based upon one-way ranging between the user and GPS satellites. The GPS satellites transmit signals having the times-of-transmission and orbital parameters for their respective time variable locations-in-space. A GPS receiver measures the ranges to typically four satellites simultaneously in-view by correlating the incoming GPS signals to internal GPS replica signals and measuring the received phases against an internal clock. These ranges are generally called pseudoranges because they include a term for the error of the internal clock. The pseudoranges are then used in location equations having calculated quantities for the locations-in-space for several satellites and the directional cosines from the user location to the satellites. With four equations for four GPS satellites, respectively, the GPS receiver can resolve the four unknowns of a three dimensional geographical user location and a correction to the internal clock. Fewer than four satellites are required if other location information is available. However, many GPS receivers today use up to twelve GPS satellites in an overdetermined solution in order to improve location accuracy.

Two types of orbital parameters are transmitted for determining locations-in-space for the satellites, almanac data and ephemeris data. The almanac data includes relatively few parameters and is generally sufficient for determining locations-in-space to a few kilometers. Each GPS satellite broadcasts the almanac data for all the GPS satellites on a twelve and one-half minute cycle. Almanac data is updated every few days and is useful for several weeks. Because of its relatively long lifetime, the almanac data is typically used by GPS receivers that have been off for more than a few hours for determining which GPS satellites are in-view. However, as the inaccuracy of the location-in-space of a GPS satellite transfers to an inaccuracy in the user location, almanac data is not used by existing GPS receivers for ranging. The ephemeris data provides relatively more parameters and is much more accurate. Typically, current ephemeris data is sufficient for determining locations-in-space to a few meters or a few tens of meters at current levels of selective availability. Each GPS satellite broadcasts its own ephemeris data on a thirty second cycle. Ephemeris data is updated each hour. However, after about two hours the accuracy of the ephemeris data begins degrading. Typically, ephemeris data that is more than about two to four hours old is not used for ranging.

A stand alone accuracy of existing commercial GPS receivers is a typically within about twenty meters or within about one-hundred meters with selective availability (SA). In order to achieve these accuracies, existing GPS receivers use the current ephemeris data for determining the locations-in-space of the GPS satellites in location equations. In order to improve the stand alone accuracy with or without SA, differential GPS (DGPS) systems use a GPS reference station having an accurately known reference location for providing DGPS corrections. The DGPS corrections are computed from the differences between the ranges that the GPS reference station measures in a conventional manner and ranges that are calculated based upon the known location. A remote GPS user receiver receives the DGPS corrections with radio signals for correcting the raw pseudoranges that it measures to the same GPS satellites at the same times as the GPS reference station. Using such DGPS corrections, GPS receivers can obtain a location accuracy within a meter or even better. Alternatively, the raw pseudoranges can be transmitted or put onto a disk and carried to another site for differential correction.

Several applications for GPS receivers require or make desirable a fast time to a first location fix after having been off or in a standby mode for more than a few hours. One of the problems in getting a fast location fix is that the GPS receiver needs to collect new ephemeris data before the location can be computed. Typically, the ephemeris data is obtained directly from the GPS satellites in the GPS signals. However, up to about thirty seconds is required to acquire ephemeris data in this manner. It has been proposed that this thirty seconds can be eliminated in one of two ways. First, if location is not needed at the remote, the solution can be computed at a network base station where current ephemeris data is available. In this case, the raw pseudoranges are sent to the base station along with the satellite identifications and times. Second, if the location is needed at the remote, the base station sends the current ephemeris data including the satellite identifications and times to the remote for location determination. These schemes are attractive for real time DGPS systems where radio equipment is already required. Unfortunately, these proposals require the transmission and reception of a relatively long data string for the ephemeris data of approximately 1500 bits per satellite or 15000 bits for ten in-view satellites. Further, the transmission and reception must be accomplished every few hours in order that the ephemeris data be up-to-date.

Hatch et al. in U.S. Pat. No. 5,764,184 discloses a method and system for post-processing DGPS system satellite positional data. Hatch recognizes that almanac data is sufficiently accurate for computation of directional cosines because the high altitude of the GPS satellites renders the directional cosines relatively insensitive to errors in satellite locations-in-space. The almanac-based directional cosines are then used in post-processing to map reference station corrections to user receiver stand-alone position information for correcting the user position. An advantage asserted by Hatch is that substantially less information is required to be saved by the user for post-processing. However, Hatch does not address the issue of the acquisition time for the user receiver for receiving ephemeris data for ranging in order to obtain the stand-alone position.

There is a need for a GPS system where a remote GPS user receiver has a fast time to first fix without a requirement of receiving current ephemeris data.

SUMMARY OF THE INVENTION

It is therefore an object of the present invention to a provide fast and accurate global positioning system (GPS) location using almanac or non-current ephemeris orbital data for determining locations-in-space of GPS signal sources and then compensating by using the same almanac or non-current orbital data again in the calculation of the location.

Briefly, in preferred embodiments, a system of the present invention includes a GPS reference receiver and a remote GPS user receiver for determining an accurate user location. In a first embodiment the GPS user receiver determines a precise user location based upon DGPS corrections. In a second embodiment the GPS reference receiver determines an accurate user location that may or may not be differentially corrected.

In the first embodiment, the GPS reference receiver determines coarse DGPS corrections from the differences between ranges that are measured to GPS signal sources and ranges that are calculated between a known location and coarse locations-in-space of GPS signal sources where the coarse locations-in-space are based upon GPS almanac or non-current GPS ephemeris data. The GPS reference receiver radios information for the coarse DGPS corrections to the GPS user receiver. The GPS user receiver measures pseudoranges to the GPS signal sources and uses the coarse DGPS corrections for differentially correcting the measured pseudoranges. The GPS user receiver then uses the differentially corrected pseudoranges with coarse locations-in-space for the GPS signal sources based upon the same GPS almanac or ephemeris data for determining a precise differentially corrected GPS user location.

In the second embodiment, the GPS reference receiver may or may not determine DGPS corrections. The GPS user receiver measures pseudoranges to GPS signal sources and uses almanac or non-current ephemeris coarse orbital parameters for determining a coarse user location. The GPS user receiver then radios the coarse user location and information for the satellites and the version of the almanac or ephemeris that was used to the GPS reference receiver. The GPS reference receiver uses the same coarse orbital parameters for re-calculating the user pseudoranges. DGPS corrections may or may not be applied to differentially correct the user pseudoranges. The GPS reference receiver then uses the recalculated pseudoranges for computing a more accurate user location.

An advantage of the present invention is that a remote GPS user receiver does not require current GPS ephemeris data, thereby enabling the receiver to provide a fast time to first fix for an accurate GPS location.

These and other objects and advantages of the present invention will no doubt become obvious to those of ordinary skill in the art after having read the following detailed description of the preferred embodiments which are illustrated in the various figures.

BRIEF DESCRIPTION OF THE DRAWINGS

FIG. 1 is a block diagram of a differential global positioning system of the present invention including a global positioning system (GPS) reference receiver and a GPS user receiver;

FIG. 4 is a table of GPS almanac parameters used in the system of FIG. 1;

FIG. 5A is a block diagram of a second embodiment of a GPS reference receiver of FIG. 1;

DETAILED DESCRIPTION OF THE PREFERRED EMBODIMENTS

Figure 2A:
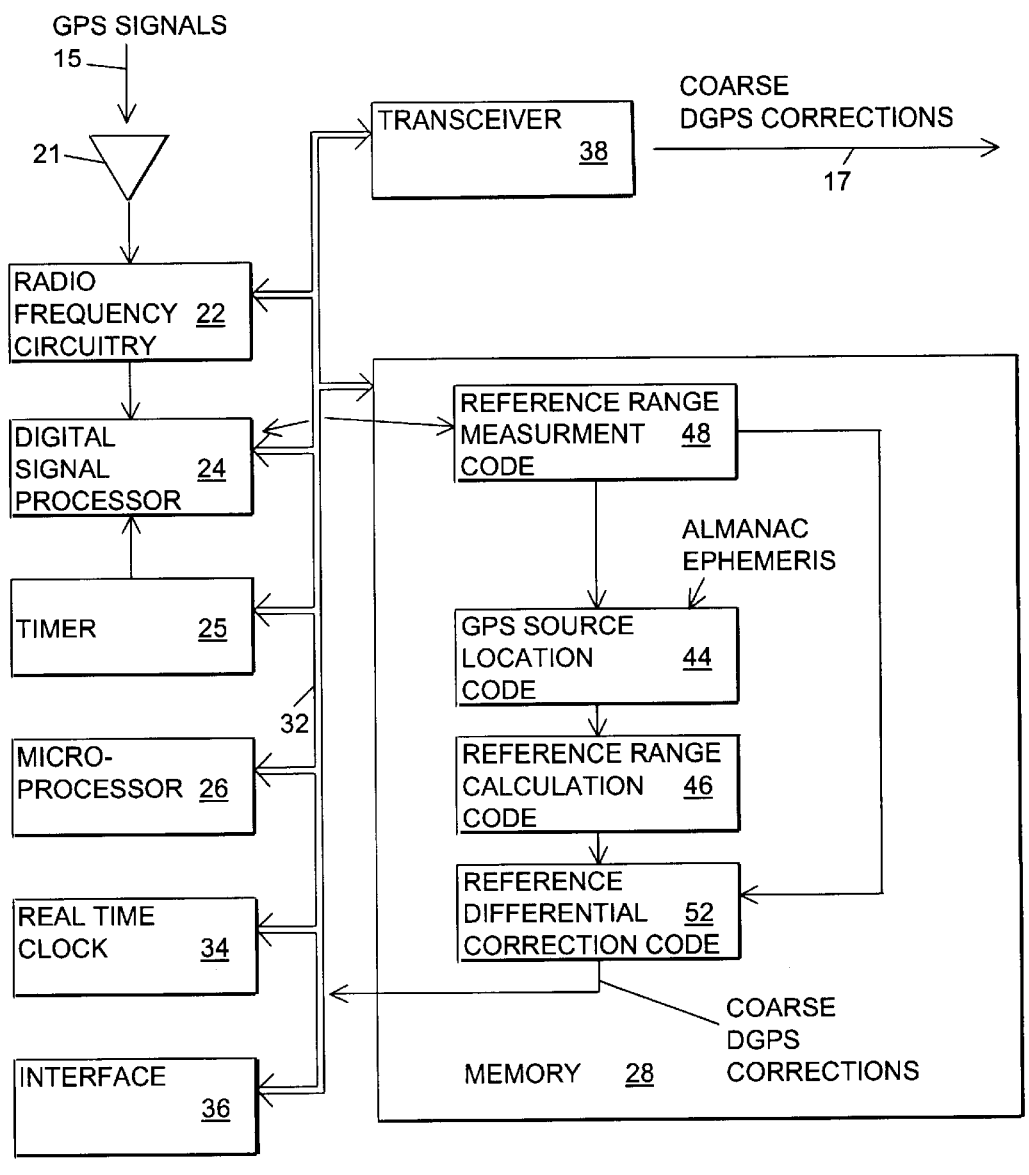
FIG. 2A is a block diagram of the GPS reference receiver of FIG. 1.

FIG. 1 is a block diagram of a differential global positioning system of the present invention referred to by the general reference number 10. The system 10 includes a GPS reference receiver 12 and a GPS user receiver 14. The GPS reference receiver 12 and the GPS user receiver 14 both receive GPS signals 15 from GPS signal sources 16. Typically, the GPS signal sources 16 are GPS satellites. However, other sources of GPS signals 15 such as GPS pseudolites can be used. The GPS signal 15 from each of the GPS signal sources 16 has an L-band carrier signal modulated by GPS data bits of twenty milliseconds that are spread by a pseudorandom (PRN) code that repeats every one millisecond. The GPS data bits and the PRN codes of all the GPS signal sources 16 are synchronized to transmit at the same times beginning with 00 hours, 00 minutes, 00.000 seconds of each GPS week and continuing throughout the week. The PRN code from each GPS signal source 16 is distinct, thereby allowing a GPS receiver to distinguish the GPS signal 15 from one of the GPS signal sources 16 from the GPS signal 15 from another of the GPS signal sources 16.

The GPS data bits are segmented into 1500 bit frames, also called pages, of thirty seconds. The frame in each GPS signal 15 includes the ephemeris orbital parameters for the GPS signal source 16 transmitting that GPS signal 15 and a portion of the almanac orbital parameters for all the GPS signal sources 16. The frames are segmented into five 300 bit subframes of six seconds each. The subframes are segmented into thirty 10 bit words. Each subframe begins with a known preamble and includes a Z-count. The Z-count gives GPS-based time-of-transmission for the preamble. Approximately two subframes are used for the ephemeris and approximately one subframe is used for the portion of the almanac within each frame. The complete almanac is transmitted by each GPS signal source 16 in twenty-five frames (pages). The ephemeris orbital data is highly accurate and is updated each hour. The almanac orbital data is about 100 times less accurate and is updated every few days.

The GPS reference receiver 12 and the GPS user receiver 14 communicate with radio signals 17 either directly or through a network control base station 18. The base station 18 may be located with or separate from the GPS reference receiver 12. The system 10 may include more than one GPS reference receiver 12 communicating through the base station 18 and usually includes several independent units of the GPS user receiver 14. The GPS reference receiver 12, the GPS user receiver 14, and the base station 18 are shown on the surface of the earth 19. However, there is no reason that the GPS user receiver 14 and/or the base station 18 could not be air or space borne.

FIG. 2A is a block diagram of a first embodiment of the GPS reference receiver 12 of the present invention. The GPS reference receiver 12 includes a GPS antenna 21, radio frequency circuitry 22, a digital signal processor 24, a timer 25, a microprocessor 26, and a memory 28. The GPS antenna 21 receives radio frequency (RF) GPS signals 15 from in-view GPS signal sources 16 and passes a representative conducted RF GPS signal to the radio frequency circuitry 22. The radio frequency circuitry 22 includes local oscillators, frequency downconverters, and samplers for receiving and issuing a sampled GPS signal at a lower frequency to the digital signal processor 24. The sampled GPS signal simultaneously includes carriers modulated by the GPS data bits spread by the pseudorandom (PRN) code from each of the in-view GPS signal sources 16.

The timer 25 provides a reference clocking signal to the digital signal processor 24. The digital signal processor 24 include numerically controlled signal generators using the reference clocking signal as a time base for generating internal GPS replica signals and correlators for providing correlation data for the correlation between the internal GPS replica signals and the sampled GPS signal. The replica signals replicate the PRN codes for each of the GPS signal sources 16 that the GPS reference receiver 12 is tracking or attempting to acquire. The microprocessor 26 receives the correlation data over a signal bus 32 and executes coded directions in the memory 28 for issuing responsive feedback adjustments over the bus 32 to the digital signal processor 24. The feedback adjustments offset the respective phases of the replica PRN codes with respect to the reference clocking signal to drive the replica PRN codes to correlate with the PRN codes in the sampled GPS signal. The microprocessor 26 may include several chips interconnected directly or over the bus 32 in order to perform in a conventional manner for reading and writing data in the memory 28, reading executable code in the memory 28, and controlling and receiving information from the elements of the GPS reference receiver 12. The memory 28 may include several chips or other storage devices.

A real time clock 34 provides an approximate absolute time to the microprocessor 26 over the bus 32. An interface 36 coupled to the microprocessor 26 over the bus 32 enables a human user and electronic devices to communicate with the GPS reference receiver 12. A transceiver 38 transmits and receives the radio signals 17 as directed by the microprocessor 26.

The memory 28 includes data that may be modified by the microprocessor 26 over the bus 32 and executable code that is read by the microprocessor 26 over the bus 32 for directing the operation of the microprocessor 26. The executable code in the memory 28 includes programs for a GPS source location code 44, a reference range calculation code 46, a reference range measurement range code 48, and a reference differential correction code 52 that are used for providing almanac-based differential global positioning system (DGPS) corrections to measured or re-calculated user pseudoranges. Details of the operation of the program codes in the memory 28 are illustrated in the flow charts of FIGS. 3A–C and further explained in the accompanying detailed descriptions.

Figure 2B:
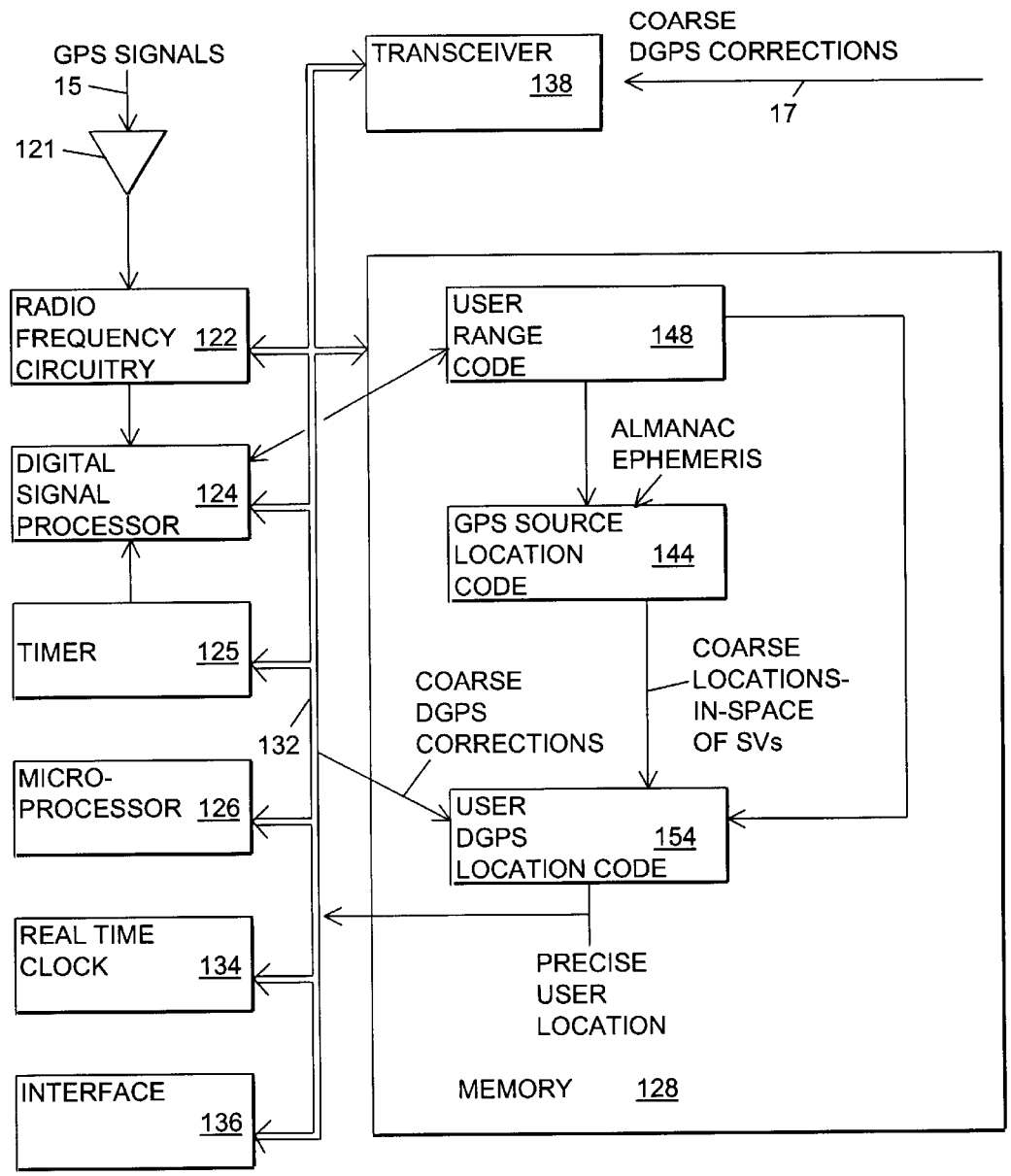
FIG. 2B is a block diagram of the GPS user receiver of FIG. 1.

FIG. 2B is a block diagram of a first embodiment of the GPS user receiver 14 of the present invention. The GPS user receiver 14 includes a GPS antenna 121, radio frequency circuitry 122, a digital signal processor 124, a timer 125, a microprocessor 126, and a memory 128 all operating in a similar manner to the GPS antenna 21, radio frequency circuitry 22, digital signal processor 24, timer 25, microprocessor 26, and memory 28 in the GPS reference receiver 12. The memory 128 includes data that may be modified by the microprocessor 126 over a bus 132 and executable code that is read by the microprocessor 126 over the bus 132 for directing the operation of the microprocessor 126. A real time clock 134 provides an approximate absolute time to the processor 126 over the bus 132. An interface 136 coupled to the microprocessor 126 over the bus 132 enables a human user and electronic devices to communicate with the GPS reference receiver 14. A transceiver 138 transmits and receives the radio signals 17 as directed by the microprocessor 126.

The executable code in the memory 128 includes programs for a GPS source location code 144 for using almanac or whatever age of ephemeris may be available for determining locations-in-space of the GPS signal sources 16 and a user range code 148 for measuring user pseudoranges. The executable code in the memory 128 also includes a user DGPS location code 154. The user DGPS location code 154 uses the locations-in-space or the GPS signal sources 16 based on almanac or whatever age of ephemeris may be available with DGPS corrections received from the GPS reference receiver 12 based upon the same almanac or ephemeris for providing a precise differentially corrected user location. Details of the operation of the program codes in the memory 128 are illustrated in the flow charts of FIGS. 3A–C and further explained in the accompanying detailed descriptions.

FIG. 5A is a block diagram of a second embodiment of the GPS reference receiver 12 referred to with a reference identification 12A. The GPS reference receiver 12A includes the GPS antenna 21, the radio frequency circuitry 22, the digital signal processor 24, the timer 25, the microprocessor 26, the real time clock 34, the interface 36, and the transceiver 38 operating in the manner described above. The GPS reference receiver 12A also includes a memory 28A that operates in a manner that is analogous to the memory 28. The memory 28A includes the GPS source location code 44, the reference range calculation code 46, the reference range measurement range code 48, and the reference differential correction code 52 as described above.

The executable code in the memory 28A also includes a compensation location code 54. The compensation location code 54 uses the coarse locations-in-space of the GPS signal sources 16 with the coarse user location for providing an accurate DGPS user location of the GPS reference receiver 12A. The compensation location code 54 is shown in greater detail in FIG. 6 and described in the accompanying description. Further details of the steps in the operation of the program codes in the memory 28A are illustrated in the flow charts of FIGS. 3A–C and described in the accompanying descriptions.

Figure 6:
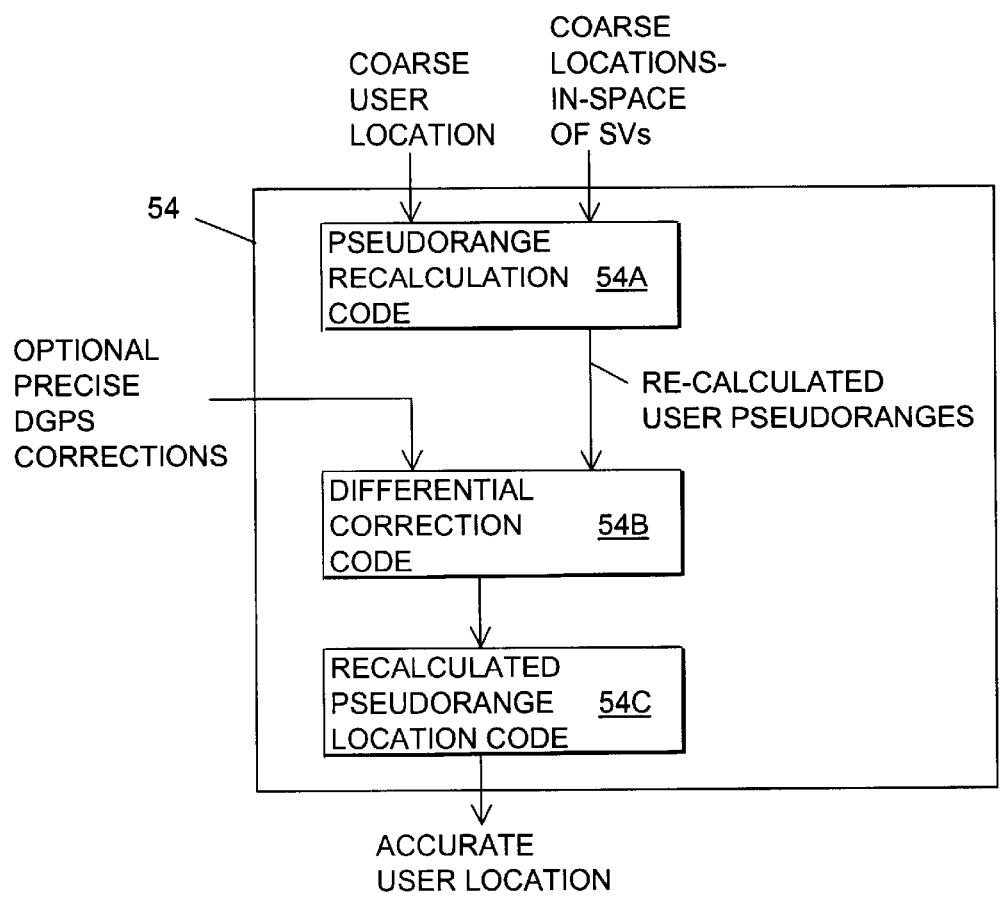
FIG. 6 is a block diagram of an almanac-based DGPS location code of the GPS reference receiver of FIG. 5A.

FIG. 6 is a block diagram of the compensation location code 54 of the GPS reference receiver 12A. The compensation location code 54 includes a pseudorange recalculation code 54A, an optional differential correction code 54B, and a location code 54C. The pseudorange recalculation code 54A uses the coarse locations-in-space of the GPS signal sources 16 (SVs) with the coarse user location received from the GPS user receiver 14A for recalculating the measured user pseudoranges. The differential correction code 54B corrects the recalculated user pseudoranges by the DGPS corrections calculated in the GPS reference receiver 12A from current ephemeris. The location code 54C uses the corrected recalculated user pseudoranges with conventional GPS location equations for determining a precise DGPS location of the GPS user receiver 14A.

Figure 5B:
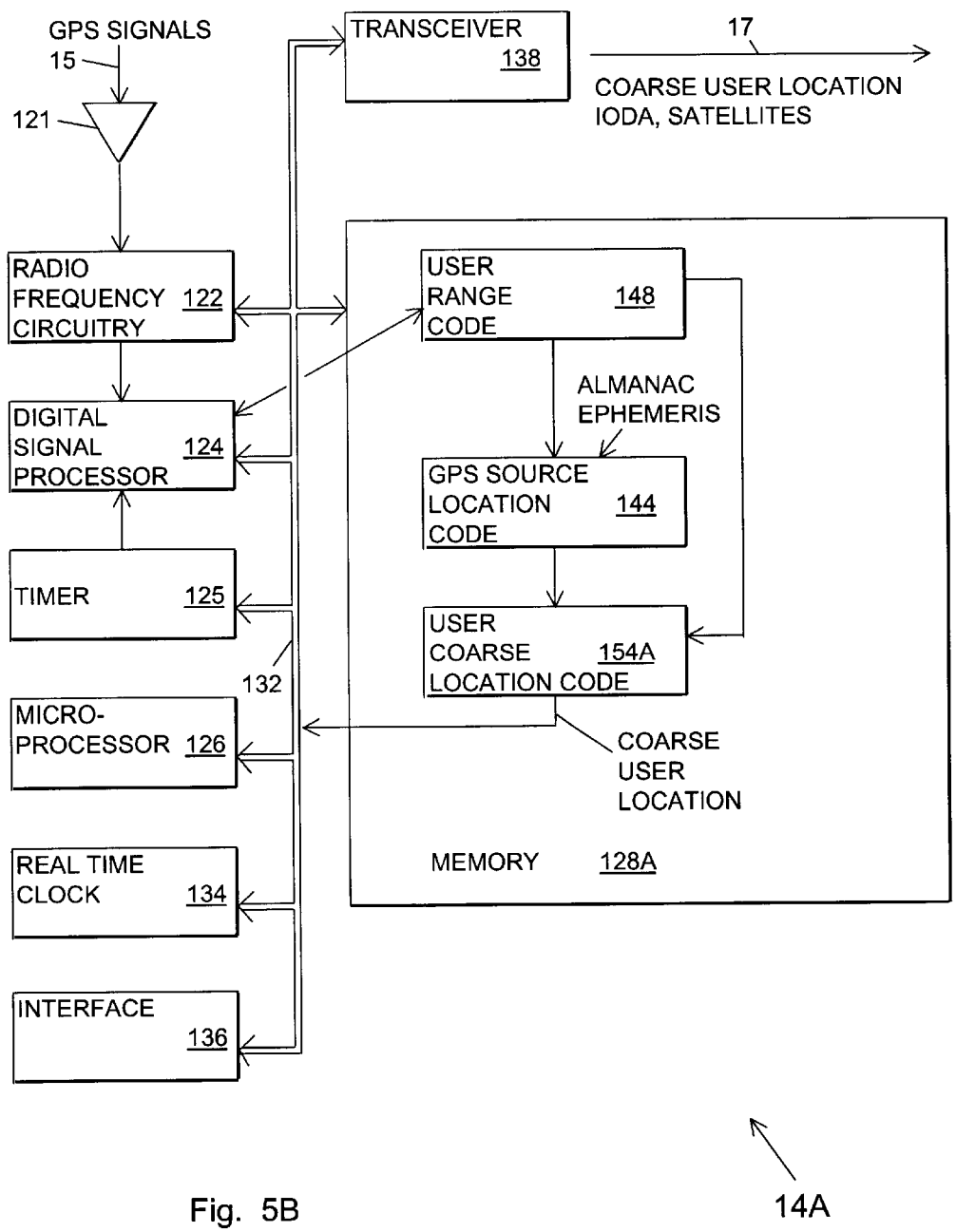
FIG. 5B is a block diagram of a second embodiment of a GPS user receivers of FIG. 1.

FIG. 5B is a block diagram of a second embodiment of the GPS user receiver 14 referred to with a reference identification 14A. The GPS user receiver 14A includes the GPS antenna 121, the radio frequency circuitry 122, the digital signal processor 124, the timer 125, the microprocessor 126, the real time clock 134, the interface 136, and the transceiver 138 operating in the manner described above. The GPS user receiver 14A also includes a memory 128A that operates in a manner that is analogous to the memory 128.

The memory 128A includes the user range code 148 and the GPS source location code 144 as described above. The memory 128A also includes a coarse location code 154A. The coarse location code 154A uses the locations-in-space of the GPS signal sources 16 based on almanac or whatever age of ephemeris may be available for providing a coarse uncorrected user location to the GPS reference receiver 12A. Details of the operation of the program codes in the memory 128A are illustrated in the flow charts of FIGS. 3A–C and further explained in the accompanying detailed descriptions.

A simplified non-DGPS version of the second embodiment provides a GPS-based user location but does not provide differential correction. Referring again to FIG. 5A, a non-DGPS version of the GPS reference receiver 12A does not require the reference range calculation code 46 and the reference differential correction code 52. Referring to FIG. 6, the differential correction code 54B is not required. A simplified non-DGPS version of the GPS user receiver 14A provides a location accuracy commensurate with the accuracy of a conventional GPS receiver when the conventional GPS receiver uses current ephemeris.

Although in the preferred embodiment certain elements are implemented with stored program code in the memory 28, 28A, 128, 128A that is executed by the microprocessor 26, it is to be understood that alternative embodiments can at least partially implement one or more of these elements in circuit hardware.

Figure 3A:
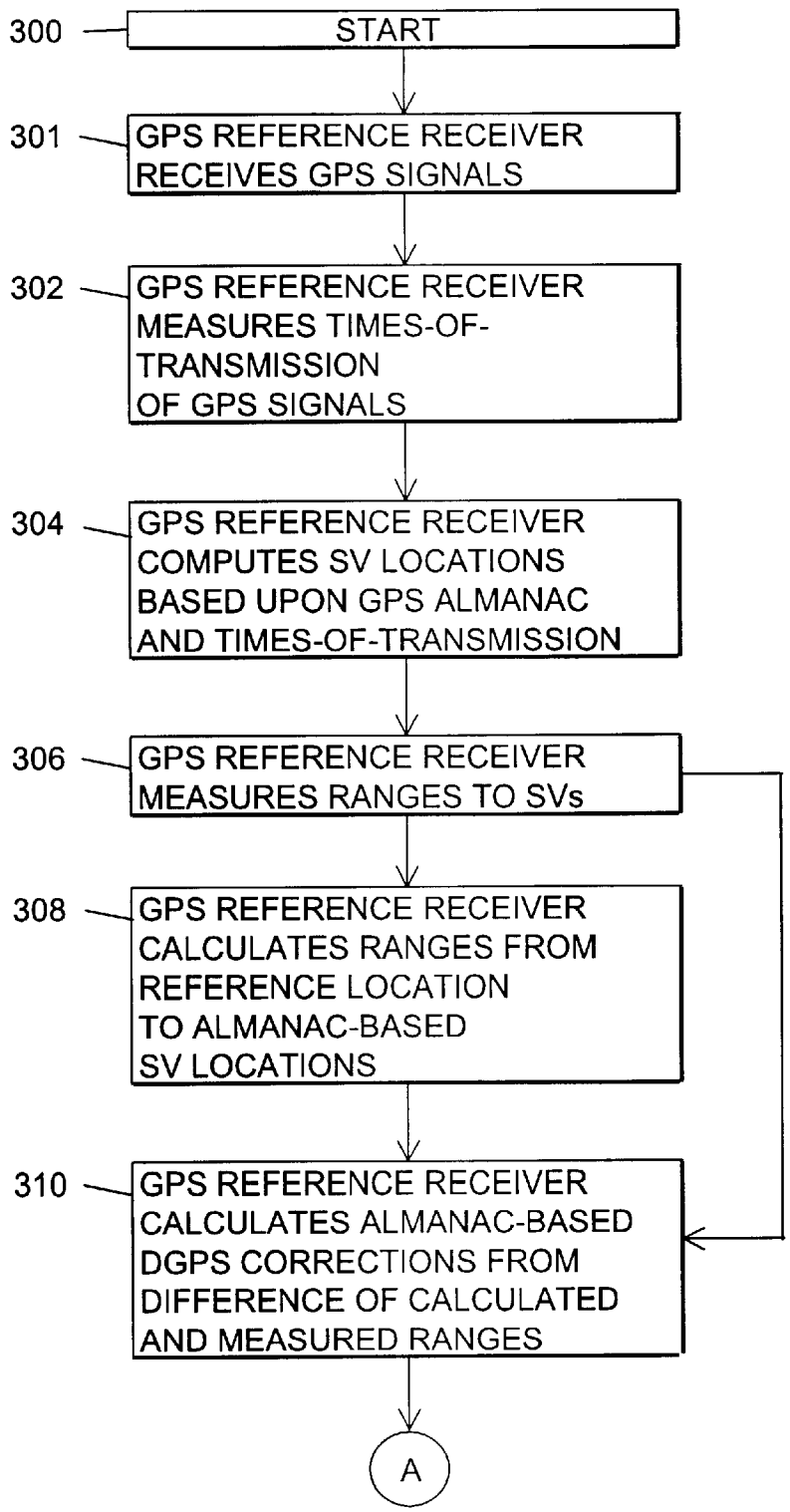
FIGS. 3A–C are flow charts of a method of operation of the system of FIG. 1.
Figure 3B:
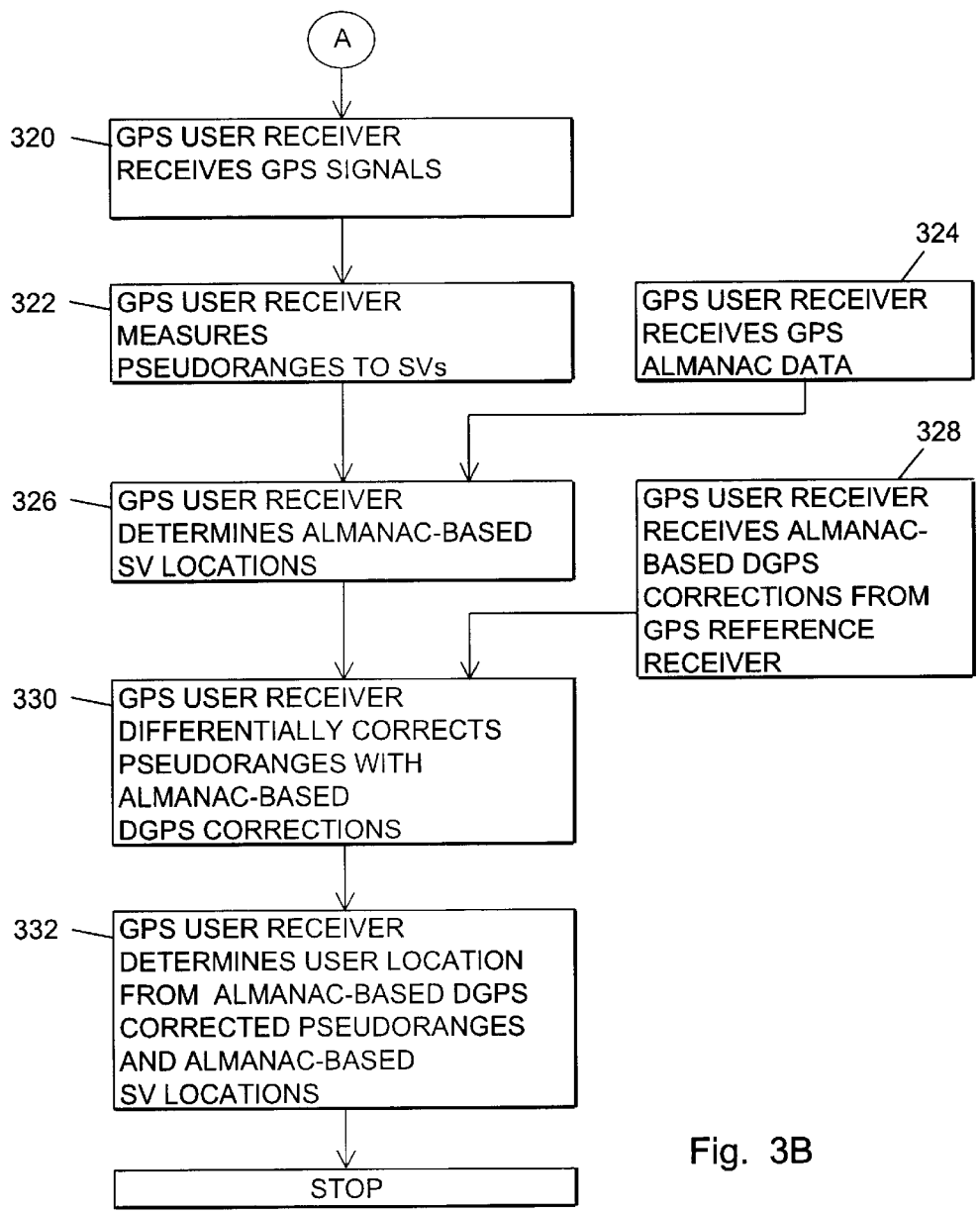
Figure 3C:
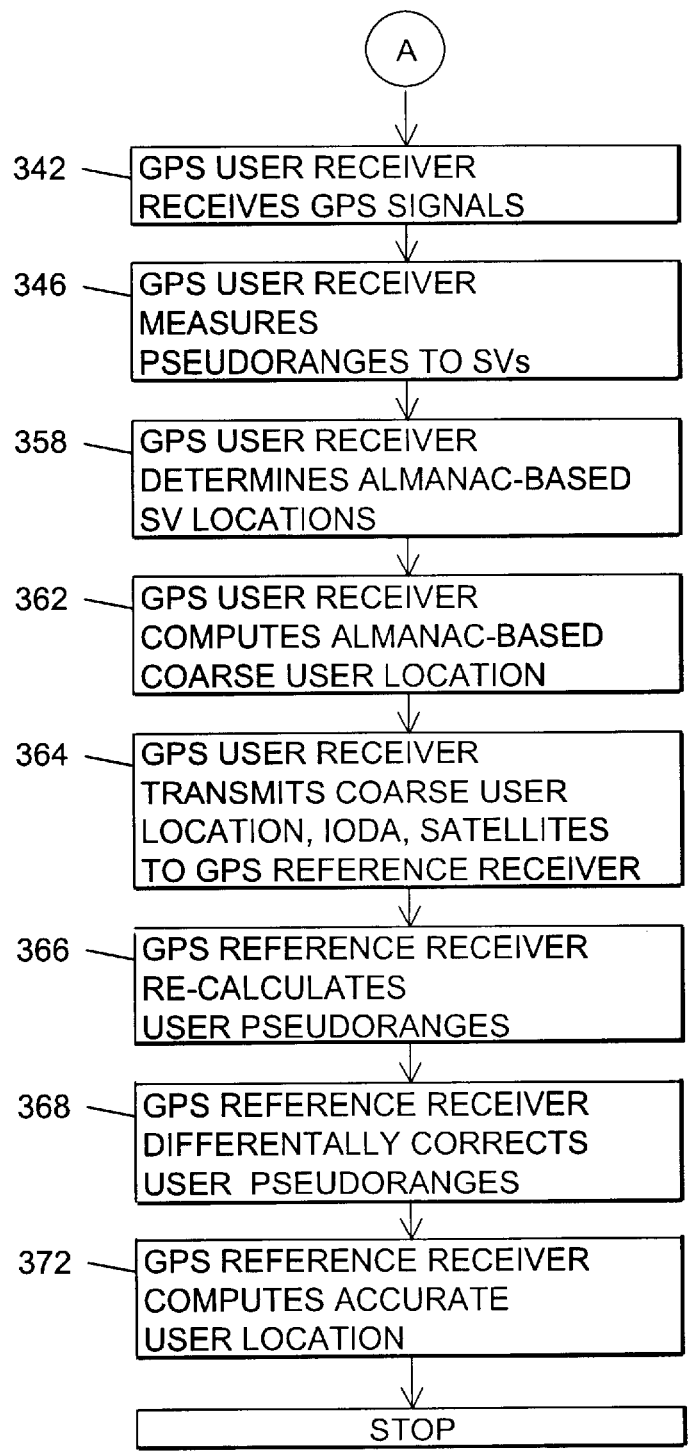

FIGS. 3A–C are flow charts of a method for a fast time to first fix for an accurate location of the GPS user receiver 14, 14A. In FIG. 3A, at the start 300 the GPS reference receiver 12, 12A stores data in the memory 28, 28A for a predetermined geographical reference location of the antenna 21 and the GPS almanac data for the GPS signal sources 16. Alternatively, the GPS almanac data can be obtained from the GPS signals 15 from any one of the GPS signal sources 16 over a period of twelve and one-half minutes. Typically, the reference location is precisely determined by a land survey. In a step 301 the GPS antenna 21 receives the RF GPS signal 15 from the in-view GPS signal sources 16. The radio frequency circuitry 22 downconverts the RF GPS signal 15, samples the downconverted GPS signal, and passes the sampled GPS signal to the digital signal processor 24.

The digital signal processor 24 in a step 302 provides correlation data for the correlation of the sampled GPS signal and an internal replica code. The microprocessor 26 follows directions in the executable code in the memory 28, 28A for adjusting the phases of the internal replica PRN codes with respect to the internal reference clocking signal and determining the phase offsets of the replica codes that provide the best correlations to the PRN codes in the sampled GPS signal. The GPS source location code 44 estimates the times-of-transmission for the GPS signals 15 from the phase offsets and the Z-count of one or more subframes. Then, in a step 304 the GPS source location code 44 uses the times-of-transmission together with new or old GPS almanac data for computing coarse locations-in-space of the GPS signal sources 16. It should be noted that the GPS source location codes 44 and 144 may also operate conventionally using new or old ephemeris data for computing the locations-in-space as long as the same orbital data is used for the calculation of the location of the GPS user receiver 14, 14A. In the flow charts illustrated in FIGS. 3A–C, the GPS signal sources 16 are abbreviated as "SVs".

GPS almanac data and a satellite (SV) health word are carried in pages one through twenty-four of subframe five, as well as pages two through five and seven through ten of subframe four, for up to thirty-two GPS signal sources 16. The almanac data is a reduced-precision subset of the clock and ephemeris orbital parameters. The data occupies all bits of words three through ten of each page except the eight MSBs of word three (data ID and SV ID), bits seventeen through twenty-four of word five (SV health), and the fifty bits devoted to parity. The number of bits, scale factor (LSB), range, and units of the almanac parameters are given in FIG. 4. In FIG. 4 the asterisk (*) denotes that the number of bits is in two's complement, with the sign bit (+ or −) occupying the MSB. A more complete description of the GPS almanac data is given in a "GPS Interface Control Document ICD-GPS-200" for the "NAVSTAR GPS Space Segment and Navigation User Interfaces" published by NavTech Seminars & NavTech Book and Software Store, Arlington, Va., reprinted February, 1995.

The reference range measurement code 48 in a step 306 corrects the bias error in the timer 25 and the transit time estimate of step the 302 and measures ranges to several GPS signal sources 16 from the phase offsets and the almanac based locations-in-space for preferably about ten of the GPS signal sources 16 using equations and methodology that are conventional except for the use of almanac-based locations-in-space in place of locations-in-space based upon the GPS ephemeris parameters.

In a step 308 the reference range calculation code 46 calculates ranges to the almanac-based locations-in-space from the known reference location of the GPS antenna 21. The reference differential correction code 52 in a step 310 calculates DGPS corrections from the differences between the measured ranges that were determined in the step 306 and the calculated ranges that were determined in the step 308. An equation 1 shows the DGPS correction $\Delta^i$ for the "i"th one of the GPS signal sources 16, termed the ith source in the discussion below.

$$\Delta^i = r^i_{rm} - r^i_{rc} \qquad\qquad 1)$$

The equation 1 shows that the DGPS correction $\Delta^i$ for the range to the ith source equals the measured range $r^i_{rm}$ between the GPS reference receiver 12, 12A and the ith source minus the calculated range $r^i_{rc}$ between the GPS reference receiver 12, 12A and the ith source. In a first embodiment the flow chart of FIG. 3A continues through "A" to the flow chart of FIG. 3B. In a second embodiment the flow chart of FIG. 3A continues through "A" to the flow chart of FIG. 3C.

FIG. 3B is a flow chart for a first embodiment of the present invention where the GPS user receiver 14 uses the almanac-based DGPS corrections for providing its own almanac-based DGPS corrected location. In a step 320 an operator keys the GPS user receiver 14 or the GPS user receiver 14 receives a wakeup call in the radio signal 17. The GPS antenna 121 receives the RF GPS signal 15 from the in-view GPS signal sources 16. The radio frequency circuitry 122 downconverts the RF GPS signal 15, samples the downconverted GPS signal, and passes the sampled GPS signal to the digital signal processor 124.

The digital signal processor 124 in a step 322 provides correlation data for the correlation of the sampled GPS signal and an internal replica code. The microprocessor 126 follows directions in the executable code in the memory 128, 128A for adjusting the phases of the internal replica PRN codes with respect to the internal reference clocking signal and determining the phase offsets of the replica codes that provide the best correlations to the PRN codes in the sampled GPS signal. Pseudoranges, so called because the range includes a term for bias error of the timer 125, are determined by the user range code 148 from the phase offsets, the positions within a GPS data bit where the phase offsets were measured, and approximate transit times from the GPS signal sources 16.

In a step 324 the transceiver 38 in the GPS reference receiver 12 directly or through the base station 18 transmits the GPS almanac data in the radio signal 17. The GPS user receiver 14 receives the radio signal 17 with the transceiver 138. Alternatively, the GPS user receiver 14 collects the GPS almanac data once a week or so from the GPS signal 15. Importantly, because GPS almanac data is useful for at least a week and typically for several weeks, the almanac data need be received by the GPS user receiver 14 only every week or so. Moreover, out-of-date GPS almanac data can be used for ranging by the present invention for several weeks so long as the same GPS almanac data is used for both the location equations and the DGPS corrections. During the intervening time, the memory 128 stores the GPS almanac data that it has received previously.

The GPS source location code 144 in a step 326 estimates the times-of-transmission of the GPS signals 15 and then uses the times-of-transmission together with the GPS almanac data for computing almanac-based locations-in-space of the GPS signal sources 16.

In a step 328 the transceiver 38 in the GPS reference receiver 12 directly or through the base station 18 transmits the almanac-based DGPS corrections in the radio signal 17. The GPS user receiver 14 receives the radio signal 17 with the transceiver 138. Alternatively, the GPS user receiver 12 informs the GPS reference receiver 14 in the radio signal 17 of the issue of data-almanac (IODA) or other indication of the particular update of the GPS almanac data that it intends to use and the GPS reference receiver 12 provides DGPS corrections based upon that particular update. The GPS almanac data, a wakeup call, and/or the DGPS corrections may be transmitted in a single transmission of the radio signal 17 or multiple transmissions.

The user DGPS location code 154 in a step 330 differentially corrects the pseudoranges with the almanac-based DGPS corrections using measurements by the GPS reference receiver 12 and the GPS user receiver 14 taken at the same times for the same GPS signal sources 16. Equation 2 shows a relationship between the measured user pseudorange $\rho^i$ of the ith one of the GPS signal sources 16 and an almanac-based range between the location $(x_u, y_u, z_u)$ of the GPS user receiver 14 and the almanac-based location-in-space $(x^i_s, y^i_s, z^i_s)$ of the ith source.

$$\rho^i - \Delta^i = [(x_u - x^i_s)^2 + (y_u - y^i_s)^2 + (z_u - z^i_s)^2]^{1/2} + b_u \qquad 2)$$

The almanac-based range to the ith source is the square root of the sum of the squares of the range $(x_u - x^i_s)$ in an "x" dimension, the range $(y_u - y^i_s)$ in a "y" dimension, and the range $(z_u - z^i_s)$ in a "z" dimension, where $(x_u, y_u, z_u)$ is the location of the GPS antenna 121 of the GPS user receiver 14 that is yet to be determined and $(x^i_s, y^i_s, z^i_s)$ is the almanac-based location-in-space of the ith source. The equation 2 is a location equation showing the user pseudorange $\rho^i$ measured by the GPS user receiver 14 to the ith source minus the almanac-based DGPS correction for the ith source equals the almanac-based range to the ith source plus the time error $b_u$ in the internal reference clock signal that is yet to be determined. The user DGPS location code 154 resolves the differentially corrected user location $(x_u, y_u, z_u)$ by a simultaneous solution of four of the equation 2 for four GPS signal sources 16. In order to linearize the mathematics, a location of the GPS antenna 121 of the GPS user receiver 14 is assumed and the user DGPS location code 154 calculates a user range $r^i_{uc}$ between the almanac-based location-in-space of the ith source $(x^i_s, y^i_s, z^i_s)$ and the assumed user location. An incremental pseudorange, termed an almanac-based linearized pseudorange $y^i$, is defined as equal to the difference between the measured user pseudorange $\rho^i$ and the almanac-based calculated user range $r^i_{uc}$ as shown in equation 3.

$$y^i = \rho^i - r^i_{uc} \qquad 3)$$

The equations 2 and 3 may be manipulated and reformatted as shown in equation 4.

$$y^i - \Delta^i = U^i \cdot X + b_u \qquad 4)$$

In the equation 4, the $U^i$ is the unit vector, often termed the directional cosines, in x, y, z dimensions to the ith source that are calculated based upon the GPS almanac data. The X is the vector location difference in x, y, z dimensions that is yet to be determined between the assumed user location and the actual user location. The equation 4 is a location equation showing that the almanac-based linearized pseudorange $y^i$ minus the almanac-based DGPS correction $\Delta^i$ equals the dot product of the directional cosines or unit vector $U^i$ times the vector location difference X; plus the internal time error $b_u$.

In a step 332 the user DGPS location code 154 uses the known almanac-based linearized pseudorange $y^i$ and the known almanac-based DGPS correction $\Delta^i$ in the equation 4 for four GPS signal sources 16 for resolving four unknowns of the vector location difference X in x, y, z dimensions and the internal time error $b_u$. The true DGPS corrected user location $(x_u, y_u, z_u)$ is then determined from the vector combination of the vector location difference X and the assumed user location. Fewer than four GPS signal sources 16 are required when other location information is available such as accurate time, altitude, inertial navigation information, dead reckoning information, or map matching. However, more than four GPS signal sources 16 may be desirable in order to improve accuracy with an overdetermined solution. Optionally, the GPS user receiver 14 transmits a radio signal 17 including the DGPS-corrected user location to the base station 18 or the GPS reference receiver 12.

FIG. 3C is a flow chart for a second embodiment of the present invention where the GPS reference receiver 12A calculates the precise DGPS corrected location of the GPS user receiver 14A. In a step 342, an operator keys the GPS user receiver 14A or the GPS user receiver 14A receives a wakeup call in the radio signal 17. The GPS antenna 121 receives the RF GPS signal 15 from the in-view GPS signal sources 16. The radio frequency circuitry 122 downconverts the RF GPS signal 15, samples the downconverted GPS signal, and passes the sampled GPS signal to the digital signal processor 124.

The digital signal processor 124 in a step 346 provides correlation data for the correlation of the sampled GPS signal and an internal replica code. The microprocessor 126 adjusts the phases of the internal replica PRN codes with respect to the internal reference clocking signal and measures the phase offsets of the replica codes that provide the best correlations to the PRN codes in the sampled GPS signal. Pseudoranges are determined by the user range code 148 from the phase offsets.

The GPS source location code 144 in a step 358 estimates the times-of-transmission of the GPS signals 15 and then uses the times-of-transmission together with almanac or whatever ephemeris orbital data is available for computing coarse locations-in-space of the GPS signal sources 16. In a step 362 the GPS user receiver 14A uses the measured pseudoranges with the coarse orbital data for computing a coarse user location. In a step 364 the transceiver 138 in the GPS user receiver 14A transmits the coarse user location along with the IODA and GPS signal sources 16 that were used in the radio signal 17 directly to the GPS reference receiver 12A or through the base station 18. In a variation of the embodiment, the GPS user receiver 14A uses the radio signal 17 for transmitting coarse linearized pseudoranges and the date of issue of the GPS almanac data that was used to the GPS reference receiver 12A.

The GPS reference receiver 12A in a step 366 recalculates the user pseudoranges from the coarse user location and the same coarse locations-in-space that were used to calculate the coarse user location. In a step 368 the GPS reference receiver 12A uses the precise DGPS corrections based upon current ephemeris for differentially correcting the recalculated user pseudoranges. Then, in a step 372, the GPS reference receiver 12A uses the differentially corrected recalculated user pseudoranges for determining the precise DGPS user location.

In a simplified variation of the second embodiment, the GPS reference receiver 12A uses the same coarse orbital parameters as the GPS user receiver 12A for correcting the coarse user location but does not apply DGPS corrections. The accuracy of the user location thus obtained approximates the accuracy that would have been obtained with the conventional method using a current ephemeris but does not provide the precision of a differentially corrected user location.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A global positioning system (GPS) method for a fast time to first fix, comprising:

measuring user pseudoranges from GPS signals transmitted by GPS signal sources;

determining a coarse GPS-based user location from said measured user pseudoranges and coarse orbital parameters including one of (i) almanac and (ii) non-current ephemeris data;

recalculating user pseudoranges from said coarse GPS-based user location and the same said coarse satellite orbital parameters; and computing a more accurate GPS-based user location from said recalculated user pseudoranges.

2. The method of claim 1, further comprising:

transmitting information for said coarse GPS-based user location from a GPS user receiver to a GPS reference receiver.

3. The method of claim 1, wherein:

the step of determining said coarse GPS-based user location includes using said coarse orbital parameters for computing coarse locations-in-space of said GPS signal sources; and using said coarse locations-in-space with said measured user pseudoranges for determining said coarse GPS-based user location.

4. The method of claim 3, wherein:

said coarse location-in space is more than one hundred meters from an accurate location-in-space calculated using current ephemeris data.

5. The method of claim 3, further comprising:

storing executable codes for the steps of measuring user pseudoranges and determining a coarse GPS-based user location; and executing said executable codes with a microprocessor.

6. The method of claim 1, further comprising:

differentially correcting said recalculated user pseudoranges with DGPS corrections determined using GPS signals transmitted from said GPS signal sources; and wherein the step of computing said more accurate GPS-based user location includes using said differentially corrected recalculated user pseudoranges.

7. The method of claim 1, further comprising:

storing executable codes for the steps of recalculating user pseudoranges and computing a more accurate GPS-based user location; and executing said executable codes with a microprocessor.

8. The method of claim 1, wherein:

said non-current ephemeris data is ephemeris data that is greater than two hours old for said GPS signal source.

9. The method of claim 1, wherein:

said non-current ephemeris data is ephemeris data that is greater than four hours old for said GPS signal source.

10. A system having a fast time to a first global positioning system (GPS) fix, comprising:

a range code for measuring user pseudoranges from GPS signals transmitted by GPS signal sources;

a user coarse location code for determining a coarse GPS-based user location from said measured user pseudoranges and coarse orbital parameters including one of (i) almanac and (ii) non-current ephemeris data;

a pseudorange recalculation code for recalculating user pseudoranges from said coarse GPS-based user location and the same said coarse satellite orbital parameters; and a recalculated pseudorange location code for computing a more accurate GPS user location from said recalculated user pseudoranges.

11. The system of claim 10, further comprising:

a transceiver for transmitting information for said coarse GPS-based user location from a GPS user receiver to a GPS reference receiver.

12. The system of claim 10, further comprising:

a source location code for determining coarse locations-in-space of said GPS signal sources based upon said coarse orbital parameters; and wherein:

the user coarse location code uses said coarse locations-in-space with said measured user pseudoranges for determining said coarse GPS-based user location.

13. The system of claim 12, wherein:

said coarse location-in space is more than one hundred meters from an accurate location-in-space calculated according to current ephemeris data.

14. The system of claim 12, further comprising:

a microprocessor; and a memory coupled to the microprocessor for storing the range code, the user coarse location code, and the source location code in a form that is executable by the microprocessor.

15. The system of claim 10, further comprising:

a differential correction code for differentially correcting said recalculated user pseudoranges with DGPS corrections determined with GPS signals from said GPS signal sources; and wherein:

the recalculated pseudorange location code uses said differentially corrected recalculated user pseudoranges for computing said GPS user location.

16. The system of claim 15, further comprising:

a microprocessor; and a memory coupled to the microprocessor for storing the pseudorange recalculation code, the recalculated pseudorange location code, and the differential correction code in a form that is executable by the microprocessor.

17. The system of claim 10, wherein:

said non-current ephemeris data is ephemeris data that is greater than two hours old for said GPS signal source.

18. The system of claim 10, wherein:

said non-current ephemeris data is ephemeris data that is greater than four hours old for said GPS signal source.

* * * * *